United States Patent
Hatzilakos

(10) Patent No.: US 6,269,636 B1
(45) Date of Patent: Aug. 7, 2001

(54) WAVE-ENERGY CHAIN-DRIVEN POWER GENERATOR

(75) Inventor: Constantinos Hatzilakos, Athens (GR)

(73) Assignee: Constantinos A. Hatzilakos, Athens (GR)

( * ) Notice: Subject to any disclaimer, the term of this patent is extended or adjusted under 35 U.S.C. 154(b) by 0 days.

(21) Appl. No.: 09/297,896

(22) PCT Filed: Apr. 8, 1998

(86) PCT No.: PCT/GR98/00010

§ 371 Date: Jul. 14, 1999

§ 102(e) Date: Jul. 14, 1999

(87) PCT Pub. No.: WO99/14489

PCT Pub. Date: Mar. 25, 1999

(30) Foreign Application Priority Data

Sep. 18, 1997 (GR) ................................................ 970100357

(51) Int. Cl.[7] ....................................................... F16D 31/02
(52) U.S. Cl. ................................. 60/398; 290/42; 290/43; 290/53; 290/54
(58) Field of Search ................................. 60/398; 290/42, 290/43, 53, 54

(56) References Cited

U.S. PATENT DOCUMENTS

| | | | |
|---|---|---|---|
| 628,457 | * | 7/1899 | Gehre . |
| 953,600 | * | 3/1910 | Edens . |
| 1,292,303 | * | 1/1919 | Garwood . |
| 2,179,537 | * | 11/1939 | Zoppa . |
| 3,911,287 | * | 10/1975 | Neville ................................. 290/42 |
| 4,319,454 | * | 3/1982 | Lucia ................................... 60/506 |
| 4,389,843 | * | 6/1983 | Lamberti .............................. 60/507 |
| 4,469,955 | * | 9/1984 | Trepl, II ............................... 290/53 |
| 4,598,547 | * | 7/1986 | Danihel ................................ 60/507 |
| 4,612,768 | * | 9/1986 | Thompson, Jr. ...................... 60/506 |

* cited by examiner

Primary Examiner—Hoang Nguyen

(57) ABSTRACT

The waves of the sea, move a float 1 vertically upwards and downwards. This motion is transferred and converted to rotational energy along a horizontal shaft 8. The float 1, an empty plastic sphere filled with ballast 11, floats half-immerged and moves the vertical metal beam 2, the length of which can be increased or decreased in order to deal with the tidal changes. The beam 2, attached with knuckle joints to the ends of a biparallel metal lever 3, transfers the vertical motion to the other end, to the saw 5, with the attached and vertically moving due to the biparallel lever chains 6, which rotate two gears, each chain to the diametrically opposite side of each gear, so that in every up/down movement, one gear is producing action while the other moves freely 20. The gears rotate the horizontal shaft 8 which is fitted on them and the horizontal shaft gives motion to the generator. Thus, every movement of the float 1, whether upwards or downwards, small or big, rotates the shaft 8. This device, from float to generator, forms one unit. Many units placed in parallel side by side, activate a common shaft 8, which activates the generator. The floats are restricted inside metal cages 21 or inside recesses built in piers 24 and act as the cylinders of a multi-cylinder engine, independently one from the other, but cumulatively with enhancing power, on the same shaft. Many units form a group of units.

5 Claims, 6 Drawing Sheets

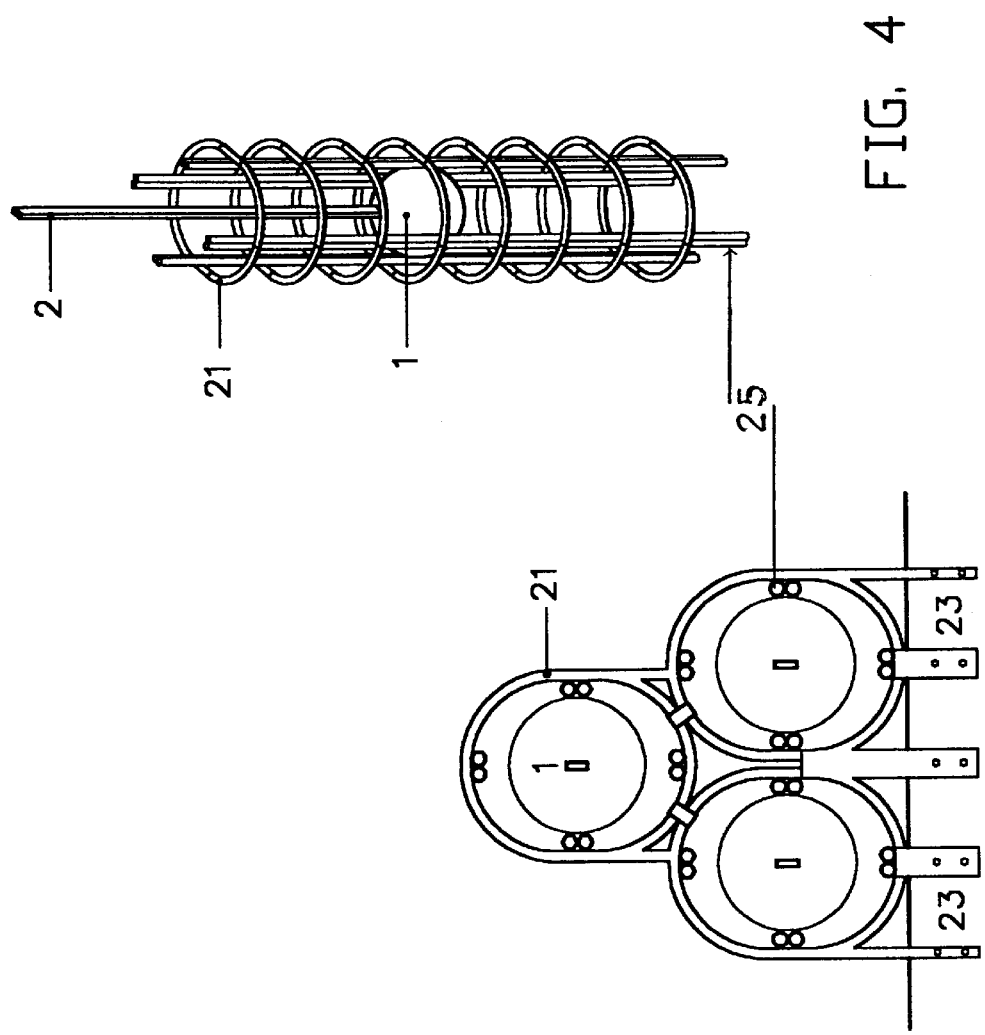
FIG. 4
FIG. 5
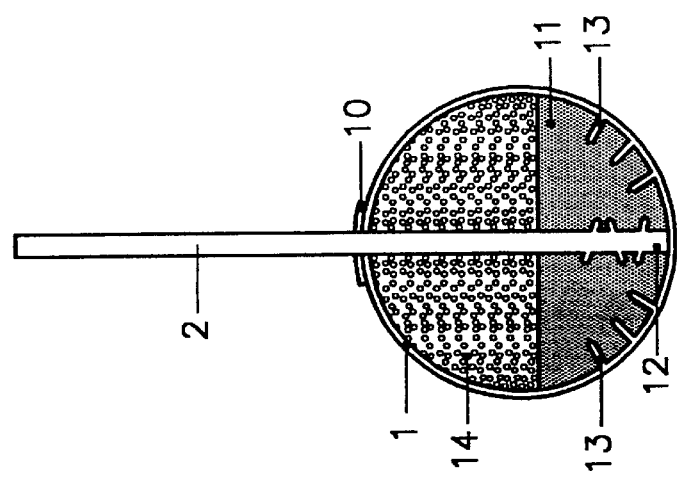
FIG. 3

WAVE-ENERGY CHAIN-DRIVEN POWER GENERATOR

This invention refers to a method for the production of electric energy using the forces of sees waves. Even though the waves of the sea are an inexhaustible energy resource, up to now no method witch could be put to industrial use, both economically and practically applicable, has been announced. Efforts have been made, but the practices witch were applied, proved to be too complex, very expensive and difficult in their use. The systematic study of the principles and the problems involved, led to the invention of a new method.

The new method, witch is presented here, offers many advantages. It is simple in its construction. It does not require any configuration and or preparation of the seabed. It is simple and inexpensive in its operation. It does not require big waves in order to function. The transfer and conversion of the vertical motion of the surface of the sea, upwards-downwards to a rotational motion, is based on a simple mechanical system. The electric current output is direct, without any need for intermediate energy storage of any form. It is possible and easy to place a number of energy units, in a series, in order to form group of units and groups of units. This allows mass economical production.

The waves of the sea move a float vertically, up and down. Thus, the float rises to the crest and descends to the hollow of the wave, in a vertical upwards-downwards recalling motion. If the sea wave crashes against a pier, jetty or breakwater, then the reflection increases proportionally the potential of the wave—i.e. the quantity of the work a force can produce. With the transfer and conversion device we invented, this vertical motion is transferred and converted to a rotational motion, along a horizontal shaft, which finally activates the generator.

This transfer and conversion device, consists of the following components (drawings 1–2).

1. The float (1) 2. The vertical metal beam witch is incorporated into the float (2). 3. The metal biparallel lever which transfers the up-down vertical movement of the float to the other end of the lever (3). 4. The lever's support mounting, which acts as a fulcrum (4). 5. The saw, a vertical metal beam, turned in its two points at 90 degrees (5). 6. The two gear chains, like those used in a bicycle, which are attached to the ends of the above mentioned beam, witch we have named a saw, and witch are taut with the assistance of special stretchers and give the impression of a vertically moving saw, with the chains in the place of the metal dented blade (6). 7. The two gears on which the chains act, converting the linear vertical motion (7).

The gears, like the gears used in a bicycle, can move producing action towards one direction and freely towards the other. 8. The shaft (8) on which the above mentioned gears are fitted, two per transfer system. Special bases (bearings) support this shaft (9). All these components form one unit. More than one unit, placed in parallel and side by side, form groups of units (FIG. 9) which act on the same shaft in the manner a petrol engine piston would. This device offers many advantages compared to a petrol engine. The most significant of these are the following: First, the length of the vertical stroke of the floater is not of any importance. Second, no matter whether the floaters move simultaneously. Thirdly, while in the case of four stroke engines, the piston is only active in one out of four movements, remaining passive during the other three, here all the movements are active and utilize the force transferred by the floaters in their upwards-downwards potion in its entirety.

Construction and function of each main component of the unit. The floater (1) is an empty plastic sphere, in a material such as used for the construction of buoys. The spherical form gives the smallest resistance to the motion of the water, however other forms may be used as well. The diameter of the spherical floater depends on the unit's desirable potential. The floater has an opening in one of its poles (10), which is used for the injection of a quantity of concrete such as to allow the floater to stay afloat, half-immersed in the water. The vertical metal beam (2) also passes from this opening, the lowest part of which with its metal latest endings (12) is fitted on the bottom of the floater. The floater has similar plastic endings in its bottom (13) allowing beam, concrete and floater to become one body. Thus (for example) if the spherical floater has a diameter of 1.25 m. with a ballast which half immerses it, it will go up and down following the waves with an impulsive force of approximately 500 kilograms, i.e. the weight of the displaced water. The rest of the gap in the interior of the floater is filled with light waterproof material in grains as felisol (14). This material, soaked in a special adhesive fluid, is compressed in order to become a compact body. This way, there is no room left for the water, which could otherwise possibly get into the floater from some crack. The opening is sealed with an extra plastic cap to become entirely watertight. The ballast also helps to maintain the vertical position of the beam.

The vertical metal beam forms part of the biparallel lever, which with its knuckle joints, fitted in the entire transfer system, carries the floater's vertical upwards-downwards motion to its other end, the saw, and then the saw carries it to the chains. The length of the vertical beam is convertible, so that the distance of the floater from the lever can be modified to conform to the tidal changes of the sea surface level. The lever has made biparallel, because this is the only way the floater's metal beam on one end and the saw on the other can move vertically and in parallel. Furthermore, the biparallel lever can be fortified and may, as required by the prevailing conditions, become stronger with three parallel beams (triparaliel). The two chains are fitted to the two ends of the saw and with the use of the four stretchers (16) and pressure exercised on the gears is regulated so that these gears will neither be loose to get out of position, nor be in danger of breaking. The interposed springs absorb any vibrations from the sudden changes of the direction of the floater, particularly in cases of rough waves. When the springs are halfway compressed, this is an indication that the chains are satisfactorily taut. For better security, shields (18) are placed on the gears, in parallel to the shaft, in order to prevent the chains from getting out of position, without impending their free movement. Still, should there be trouble in one of the units, the mechanical system is immobilized with one hydraulically operating beam (19) which stops the biparallel lever and leads it to immobilization on the upper end position of the floater. When one unit is immobilized, the other units can continue to operate. The system is also used when a unit has to be immobilized for its scheduled maintenance works, without interruption to the operation of the other units in the line.

The chains engage the gears (8), each on the diametrically opposite side. With this invention, we have always in the system's every vertical motions, dynamic energy. When the floater is going up, the saw with the chains on the other end of the lever is going down and one chain moves one gear (20A) towards one direction (a) with dynamic energy, while the other chain moves the other gear (B) to the opposite direction (b), moving freely (without producing work).

When the floater is going down, the saw with the chains is going up. Then, one chain moves gear (B) towards direction (c) with dynamic energy, while the other chain freely moves gear (A) to the opposite direction (d). Thus, every move of the floater, whether big or small, upwards or downwards, rotates the shaft. Note is made that between the shaft and the generator, there are devices for the amplification and stabilization of the revolutions at the desired level. For an improved system performance, the floaters are restricted inside metal cages (21). These cages keep the floaters in a restricted space, so that they will not be carried away by the waves, without impeding either their vertical motion or the free passage of the waves. These cages are made by metal pipes of particular specifications, while their outer diameter depends on the diameter of the floater and the wave conditions prevailing in the area. The sectional plan of the cage has an elliptical form, determined in its inner side by two circles, the radius of each one of which is equal to the radius of the spherical floater, plus (+) the length of the external diameter of the pipe used, plus (+) 2 cm facilitating their vertical motion, while their centers are placed at a space equal to the vertical distance between the two positions assumed by the center of the floater, i.e. the position of the floater when the lever is at a horizontal position, and the position of the floater when the lever is at any one of its extreme, upwards or downwards, positions. This is necessary because the floater, in its vertical motion, follows an orbit of an arc with a radius equal to the length of the leverage (the lever arm which carries the floater). A similar orbit is followed by the other lever arm, the one carrying the saw, which we called resistance lever arm. That is why the center of the shaft must be in equal distance from the vertical positions assumed by the chains, one chain when the lever is horizontal and the other chain when the lever takes one of its extreme positions.

Eight pipes placed vertically in pairs and crossed, are welded on the inner walls of superposed metal constructions, as these have been described before, in horizontal parallel planes and in equal spaces between them, every 30 to 50 cm, and these form the cage of each floater. The cages are made fast by driving their eight lower ends in the sea bed—if the formation of the sea bed allows it—and by firmly securing them on the vertical walls and the upper part of the solid concrete breakwater (23) or on any coastal construction we may use for the electricity generation unit.

The concrete piers or breakwaters are preferable for many reasons:
1. They boost the waves, when crash on them and return.
2. They offer a steady support for the positioning of the units on line, the levers support mounting, the shaft, the generators, components, devices, revolution stabilizers and all other parts involved in the generation of electric energy.

Our long term studies and other measurements, showed that for the best system performance, the piers must, wherever that is possible, rise from the average level of the surface of the sea by 1.5 to 2 meters and reach to a depth of approximately the same. Each unit, even though independently active, must co-ordinate its action to the action of other units, in order for all of them to act cumulatively on the same axis of the group of units 8). This incrementing action is not applied on the speed instead it is applied on the rotation force, which can be easily converted to the desirable speed. The required length of coast for a group of units depends on the number of units in the group and the diameter of their floaters. The Floaters, in piers specifically constructed for that purpose, can be placed in recesses, which offer better protection and strength against high waves (24). In such cases, only the 8 vertical pipes which form the cage and are fitted on the walls of the pier and on the front side open to the sea waves, only horizontal pipes are required. Drawing 9 presents a diagram of the sectional plan of a group of units' layout, with nine units in a straight pier and fifteen units in a pier with recesses. Shock absorbers are placed on the floor at the two ends of the lever arms, for the purpose of limiting the course of the lever to its two predetermined end positions (26).

The lever support mountings (fulcrums) in a group of units are not necessarily placed in a straight line. Their positions may vary. They may also be adjustable. However, it is necessary that the saws be lined up, because as we have mentioned they act on the same axis. It is essential that the lever, with the full mechanical transfer system, be balanced on the horizontal position when the floater is half-immersed in the water. Small variations may be regulated with the use of balance weights moved along the lever, as in a scale. All the metal parts may be build out of heavy-duty aluminum according to special specifications, offering less overall weight as well as protection from corrosion.

The floater's metal vertical beam and the vertical section of the saw may, when so required by the specific wave conditions in an area, be supported by additional parallel supportive beams, which will not impede their operation, offering instead great strength against any pressures and impacts, especially against the impact of the water on the floater (1). However, in any case, the vertical metal supports connecting the parallel beams of the lever (3) are necessary.

In the drawing 10, one can see the overall design of a group of units inside its housing (cross section). Emphasis is placed on the small well (30) along and under the shaft which allows the saw to move freely up to its lowest possible position, the shock absorbers (26), the motion hydraulic stoppers (19) and the vertical windows (31) from which the leverage passes, and which have an opening such as to allow the free movement of the lever arm. The lever ports for the protection of the interior of the housing from the impact of the air, rain and wave water are externally protected by vertical strips of plastic, which shut after each passing of the lever arms.

BRIEF DESCRIPTION OF DRAWINGS

FIG. 3, is a cross section of the plastic float showing the ballast (11), see page 2, line 23, the endings of the metal beam (12), see page 2, line 25, the plastic endings of the float (13) see page 2, line 26 and the light waterproof material, (14), see page 2, line 31.

FIG. 4 is a perspective view of a cage (21), see page 4, line 5, having inside the vertically moving float and metal beam.

FIG. 5 is a top plan view of tree floats (1) inside three cages (21), fixed in the seaside edge of the pier with supports of cages (23). See page 4, line 30.

LIST OF COMPONENTS

Figure 1:
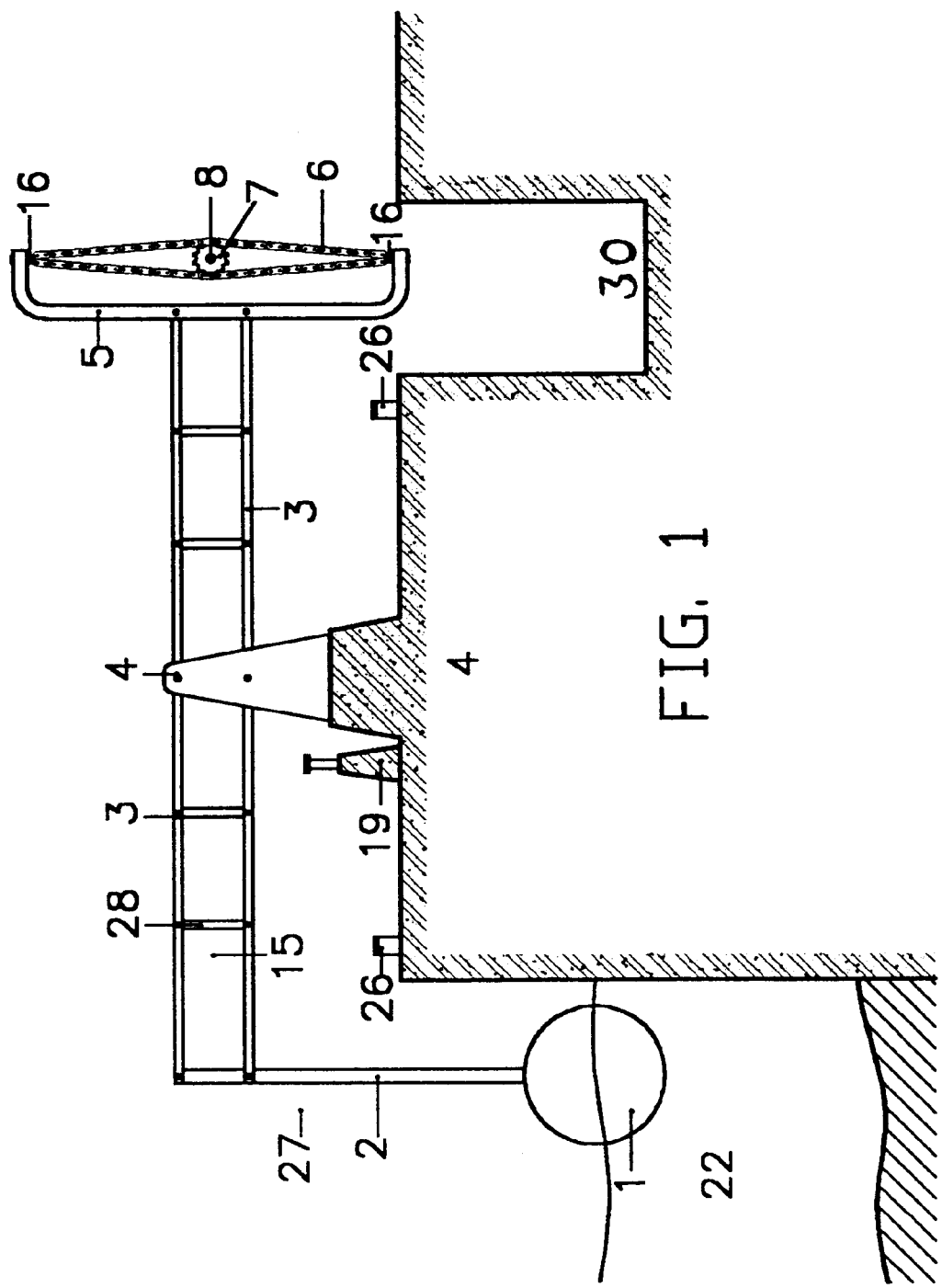
FIG. 1 is a side view of the shoreline wave power unit, showing the half emerged float (1) see page 2, line 24 of the specification,, the vertical metal beam (2), see page 2,line 24, the biparallel lever (3) in horizontal position on the pier, see page 3, lines 4 & 9, the fulcrum (4), see page 1, line 34, the saw (5), see page 1, line 34, the chains (6), see page 1, line 35, the gears (7), see page 2 line 5 and the shaft (8) see page 2 line 6.
Figure 2:
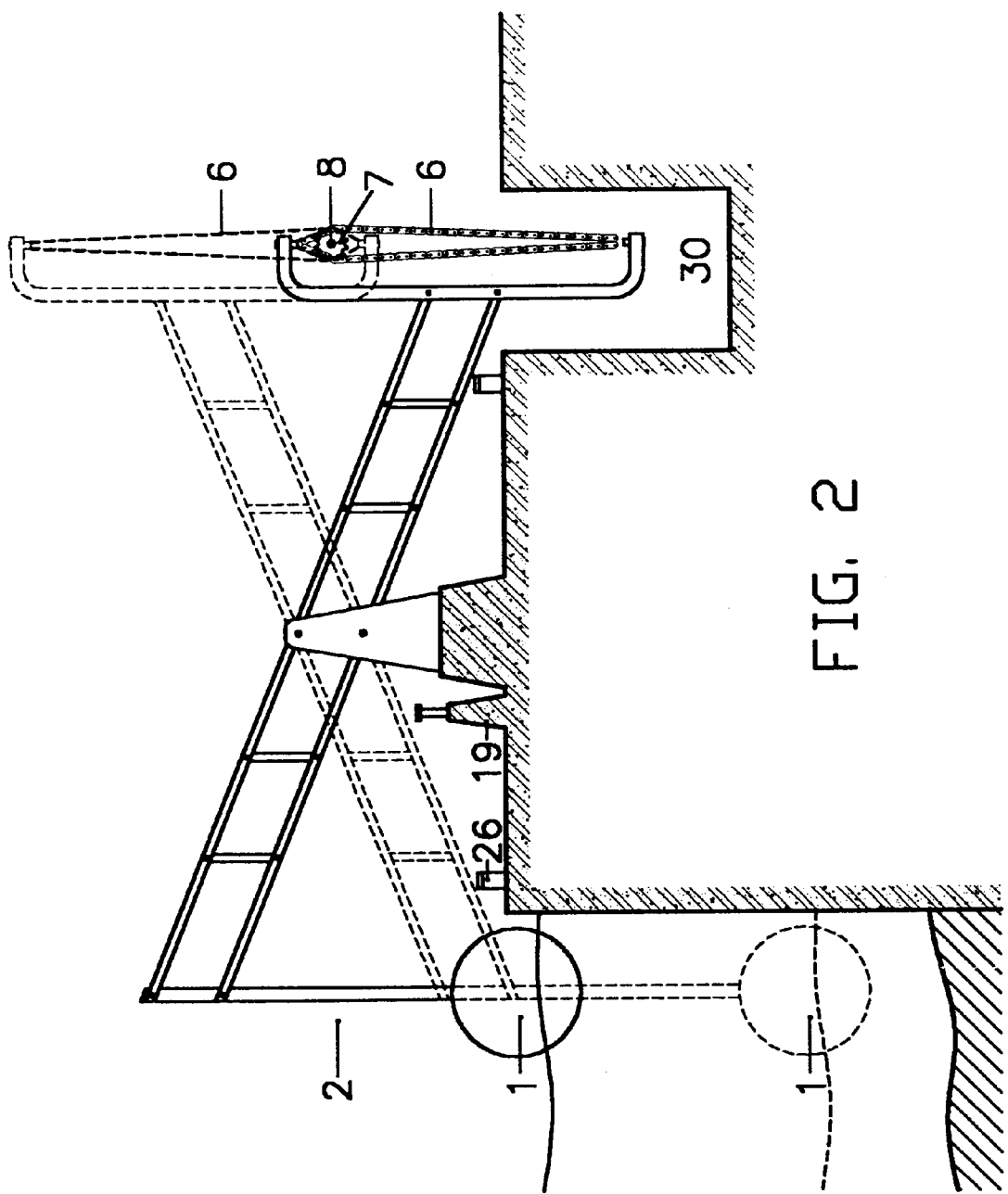
FIG. 2 is a side view of the said wave power unit, with the said float (1) and the vertical metal beam (2) in their extreme up/down positions, up position shown in continuous lines and down position in dotted lines. See page 2, line 24.
Figure 7:
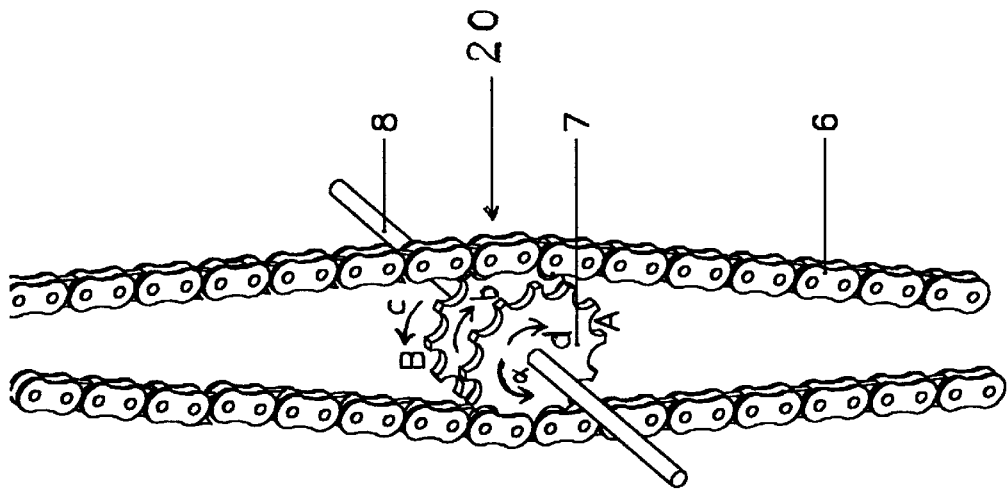
FIG. 7 is perspective view illustrating in detail, how the two vertically moving chains (6), entangle each one on the diametrically opposite side of the two gears (7), see page 3, line 28.
Figure 6:
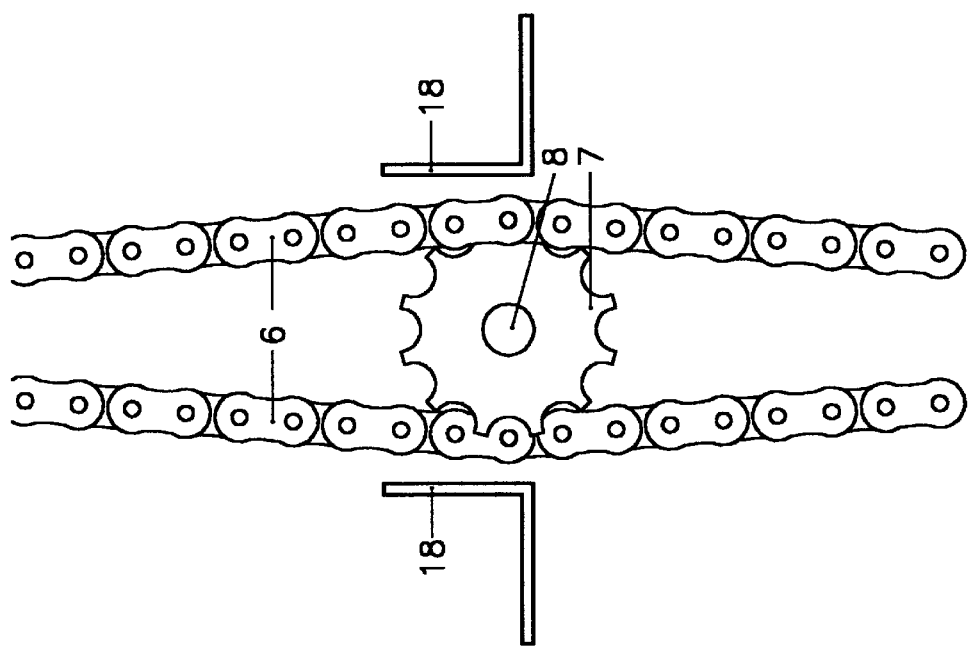
FIG. 6 is a side view illustrating in detail the shields (18), see page 3, line 19, used for preventing the chains from getting out of the gears.
Figure 8:
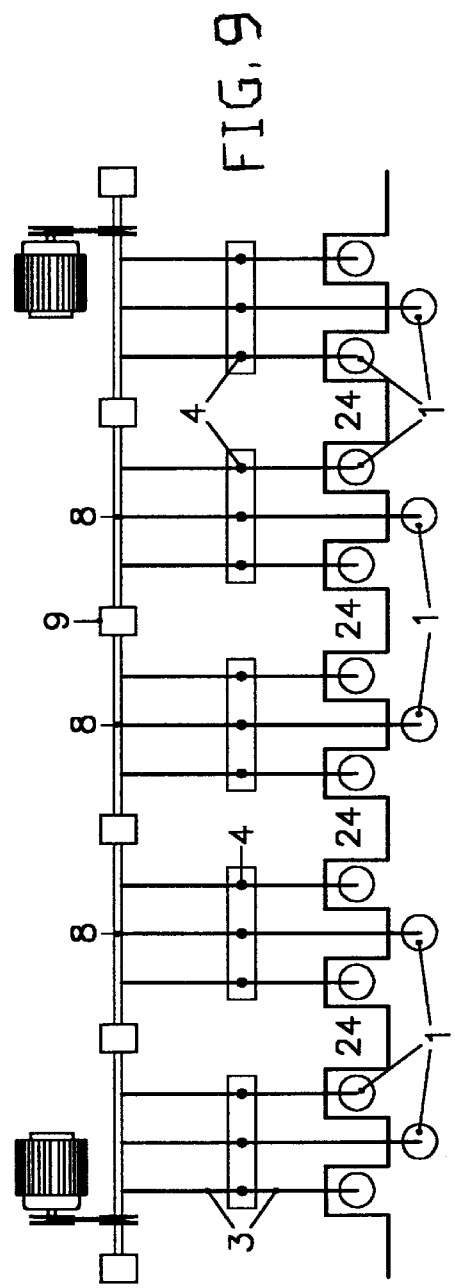
FIG. 8 is a perspective view of a pier's recesses (24), see page 5, line 13.
Figure 9:
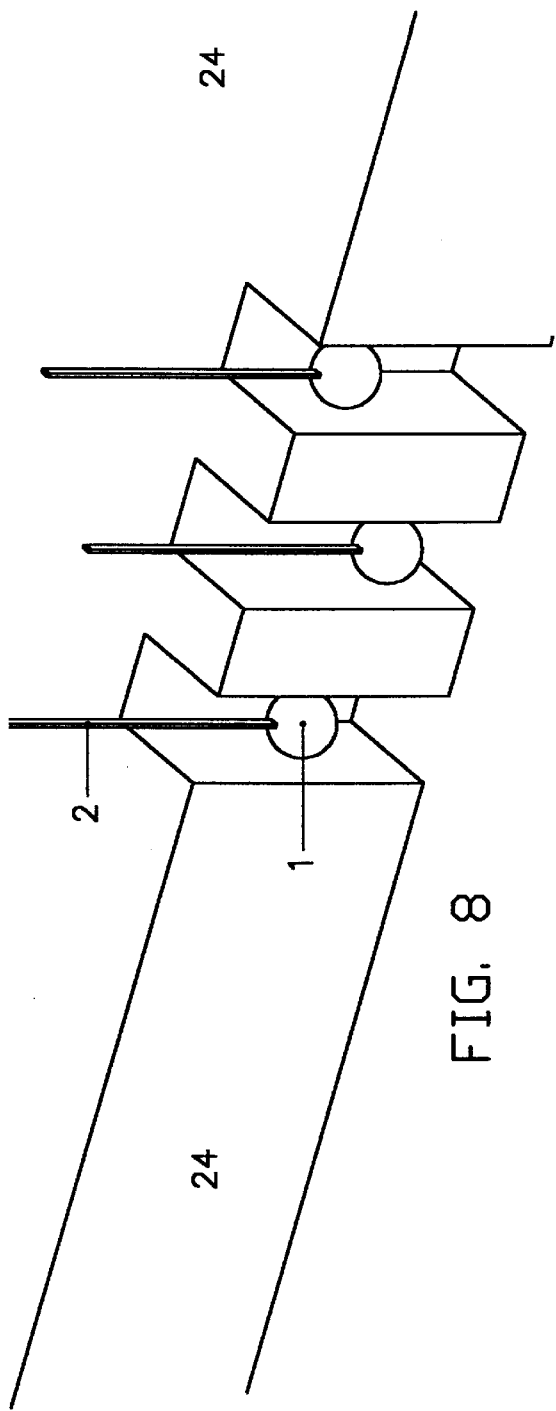
FIG. 9 is a top plan view of a group of 15 units, side by side some in recesses (24) and some outside, but all of them operating on the same shaft (8), see page 5, line 8. Fulcrums (4) and base bearings (9) see page 2, line 7, are showing.
Figure 10:
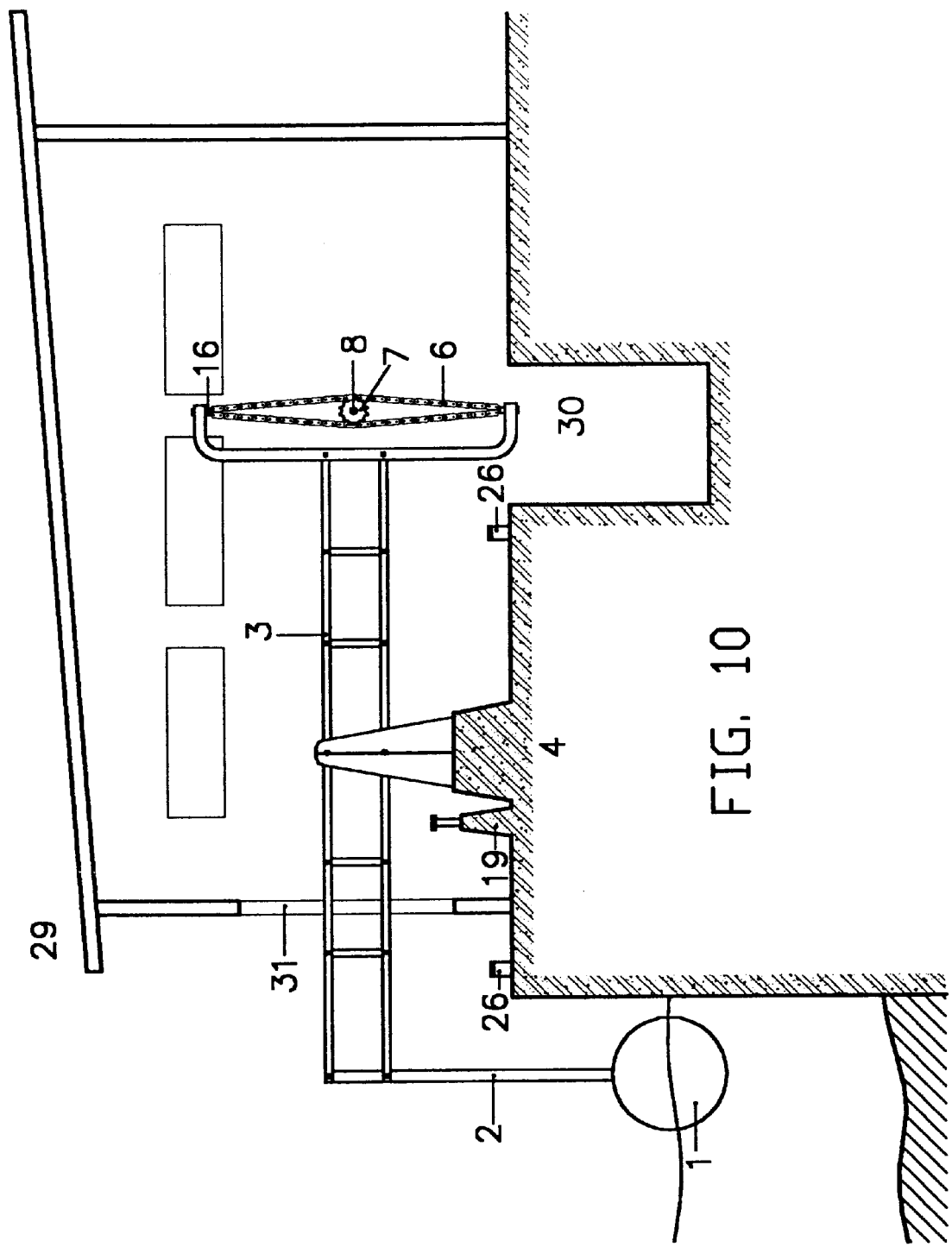
FIG. 10 is a side view of the shoreline wave power converter, illustrating a group of units, protected inside a building, as in page 6, lines 4, of the specification.

1. The floater, see page 2, line 18 of the specification and FIGS. 1 & 3.
2. Vertical metal beam, see page 2, line 24 and FIGS. 1 & 3.
3. Biparallel lever, see page 1, line 32 and FIGS. 1 & 2.
4. Lever's support, see page 1, line 34 and FIGS. 1 & 2.
5. The saw, see page 1, line 34 and FIGS. 1 & 2.
6. Chains, see page 1, line 35 and FIGS. 1, 2, 6 & 7.
7. Gears, see page 2, line 4 and FIGS. 1, 2, 6 & 7.
8. Shaft, see page 2, line 6 and FIGS. 6 & 7.
9. Base bearings, see page 2, line 6 and FIG. 9.
10. Cap of float, see page 2, line 22 and FIG. 3.
11. Ballast, see page 2, line 23 and FIG. 3.
12. Metal endings, see page 2, line 25 and FIG. 3.
13. Plastic endings, see page 2, line 26 and FIG. 3.
14. Light waterproof material, see page 2, line 31 and FIG. 3.
15. Triparallel lever, see page 3, line 12 (not shown in the drawings).
16. Stretchers, see page 3, line 13 and FIG. 1.
17. Springs, see page 3, lines 16 (not shown in the drawings).
18. Shields, see page 3, line 19 and FIG. 6.
19. Hydraulic stopper, see page 3 line 22 and FIG. 1.
20. Gears (detail), see page 3, lines 28 to 35 and FIG. 7.
21. Metal cages, see page 4, line 5 and FIG. 4.
22. Supports of cages, see page 4, line 29 and FIG. 5 (not shown in the drawings).
23. Supports of cages (on pier), see page 4, line 29 and FIG. 5.
24. Pier's recesses, see page 5, line 13 and FIG. 8.
25. Vertical pipes, see page 4, line 8 and 24, FIGS. 4 & 5.
26. Shock absorbers, see page 5, line 18 and FIG. 1.
27 & 28 Vertical supporting metal beams, see page 5, line 33 and FIG. 1.
29. House of Group of units, see page 6, line 4, and FIG. 10.
30. Well of the saw, see page 6, line 5 and FIGS. 1, 2 & 10.

What is claimed is:

1. A wave action power plant for generating electric energy comprising a plastic spherical float (1) filled with ballast (11), a vertical metal beam (2) having metal ends (12) being fitted with plastic ends (13) at the bottom of said float, said metal beam and said float moving vertically as one body and said body being protected inside a metal cage (21) or in a recess of a pier (24), said vertical beam being attached with knuckle joints to the two ends towards the sea side of a biparallel lever (3) which said fulcrum (4) is based on at the pier, at the other two ends of said biparallel lever in the other side towards the shore being attached with knuckle joints to a saw (5), the turned points of said saw are attached with stretchers including two chains (6) in vertical, aligned and stretched position, in order to transfer the vertical movements of said float and vertical beam, said chains rotating a pair of gears (7) each located on the diametrically opposite side (20), said gears move dynamically towards one rotational direction and freely towards the other rotational direction for converting the vertical motion of the sea waves to rotational motion on a shaft (8), said shaft activating a generator, said biparallel lever (3) keeping the float and metal beam in vertical diraction at one side of the lever and the saw with the chains are also in vertical direction at the other side of the lever, shields (18) protecting said chains for preventing said chains from unmeshing with the gears (7).

2. A wave action power plant for generating electric energy according to claim 1, wherein said vertical metal beam can be either increased or decreased in length, so that the distance of the float from the lever when in horizontal position, can be modified to deal with the tidal changes of the sea surface level.

3. A wave action power plant for generating electric energy according to claim 1, wherein said float and vertical metal beam, due to ballast of concrete (11), become one body able to stay in a vertical position at all times.

4. A wave action power plant for generating electric energy according to claim 1, comprising of additional vertical supporting metal beams (28), connecting the two horizontal metal beams of the biparallel lever (3), and said biparallel lever stops at the extreme up/down positions with hydraulic stoppers (19) for the needs of maintenance and also comprising of two chock absorbers placed, one on each side at the end of said biparallel lever (26).

5. A wave action power plant for generating electric energy according to claim 1, comprising a building where said plant can be protected inside, placing many units in parallel positions side by side and said units can act independently one from the other but cumulatively all on the same shaft (8).

* * * * *